Patented Apr. 23, 1935

1,998,558

UNITED STATES PATENT OFFICE 1,998,558

N-DIETHYLAMINOETHYL PARAAMINO-PHENYL ARSONIC ACID

Werner Schulemann, Vohwinkel, near Elberfeld, and Fritz Mietzsch, Elberfeld, Germany, assignors to Winthrop Chemical Company, Inc., New York, N. Y., a corporation of New York No Drawing. Application November 21, 1927, Serial No. 234,900. In Germany November 24, 1926

3 Claims. (Cl. 260—14)

Our invention relates to the compound

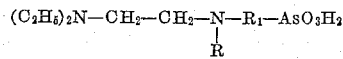

wherein R stands for hydrogen or methyl and R₁ stands for phenylene.

Our new compounds may be produced by causing a halogen-alkyl-amine to react upon an organic arsenic compound, containing an amino group. Instead of the halogen alkyl amine a substitution product can be used, such as bromoethyl-phthalimide, in which case the phthalic acid is subsequently split off.

Obviously the process can also be carried out by attaching the alkyl amino group successively to the amino groups of the various arsenic compounds, for example, by causing an organic arsenic compound, containing an amino group, to react first with ethylene oxide or a halogenated alcohol and converting the resulting hydroxyl-alkyl amino derivative in the customary manner through the respective halogenide into an amino- or alkylamino derivative. Alternatively a reactive derivative of the said class of arsenic compounds is caused to interact with an aliphatic diamine. It follows that the process can also be carried out by first converting a suitable intermediate product into a compound, which contains an amino- or alkyl-amino group linked to the amino groups of organic compounds by means of an aliphatic group and subsequently introducing the arsenic atoms or atom, respectively. Both primary and secondary amino groups, or amino groups contained in a heterocyclic ring can be employed. Moreover, it is possible to use a compound containing several amino groups. The connecting alkylene group can consist of a straight or branched chain containing any number of members, it can contain hydroxy or alkoxy groups. The amino groups connected by the alkylene group, however, must never be substituted by an aliphatic carbonyl group, as is the case, for example, in the glycine amines, carbamides, carboxylic acid amides etc. of the arsanilic acid. Compounds containing acid-amide groups would not possess the required strongly basic character. By following the principles underlying our invention one or more nitrogen groups can be connected in any desired position to the amino groups of organic arsenic compounds either adjacently or successively.

In accordance with the present invention specifically efficacious new pharmaceutical products of outstanding therapeutical value are obtained. They act on blood parasites.

The new strongly basic arsenic compounds thus obtainable are whitish to yellow powders soluble in acids to neutral solutions.

The following examples will illustrate the wide range within which our invention is applicable:

*Example 1.*—N-diethylaminoethyl-para-aminophenyl-arsonic acid

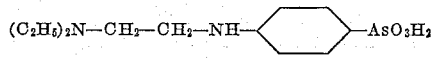

183 grams of arsanilic acid are dissolved in 1000 cc. of normal caustic soda solution and 140 grams of diethylaminoethyl-chloride are added at normal temperature. The whole is slowly heated with efficient stirring and the temperature is maintained for several hours at about 60° C., when both layers gradually combine. Then another 1000 cc. of normal caustic soda solution are added and the whole is evaporated to dryness in vacuo. The resulting strongly hygroscopic residue of the mono-sodium salt of diethylaminoethyl-substituted arsanilic acid is dissolved in a little dried methyl alcohol, filtered from the sodium chloride and again precipitated by means of a large amount of dried ether. The sodium salt is thereby precipitated as a snow-white hygroscopic powder. It is readily soluble in water, from which the free arsonic acid is not precipitated by the addition of acid. It has an arsenic content of 22.1%.

*Example 2.*

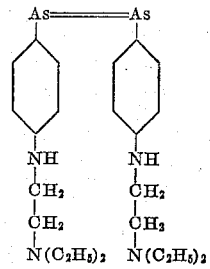

24.6 grams of the sodium salt of N-diethylamino-ethyl-para-aminophenyl-arsonic acid are dissolved in 450 cc. of water, stirred with a solution of 51.3 grams of crystallized magnesium chloride and 295 grams of sodium hydrosulphite in 1.3 litres of water and reduced in about 1½ hours in a current of an inert gas (at from 45°–55°). The sulphite solution is separated from the yellow resinous arseno compound, which is washed and dissolved in normal hydrochloric acid. The clear filtered solution is precipitated with caustic soda solution, filtered and washed. A bright yellow powder remains on drying. The arseno compound is decomposed on heating to 120° C. with formation of a yellow oil and with perceptible evolution of gas.

*Example 3.*—N-diethylaminoethyl-methylaminophenyl-4-arsonic acid

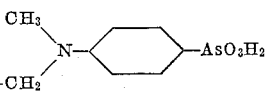

22 grams of 4-amino-N-diethylaminoethyl-methylaminobenzene of the formula:

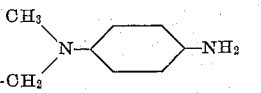

are dissolved in 135 grams of 90% sulfuric acid, whilst cooling and diazotized with the calculated quantity of nitrosyl sulfuric acid. The diazo compound is poured on ice, the excess acid is neutralized with chalk and a solution of 20 grams of dibasic sodium arsenite in 180 cc. of 5% caustic soda solution is added to the filtered solution. The reaction is facilitated by the further addition of caustic soda solution. The further working is effected as follows: After standing over night the precipitated resin is separated and extracted with ether. Then the mixture is acidified and again extracted with ether. The amphoteric arsenic acid contained in the remaining aqueous liquid is now reduced by means of sodium hypophosphite. For this purpose 190 grams of sodium hypophosphite and 0.5 grams of potassium iodide are added to the solution and 190 ccm. of concentrated hydrochloric acid are added while stirring at 40° C. In an atmosphere of carbon dioxide; after about one hour the hydrochloride of the tetra-arseno compound of the probable formula:

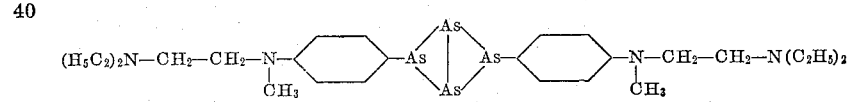

separates in the form of a vermilion flocculent precipitate. It is filtered off, dissolved in water and salted out by means of sodium chloride. The precipitated hydrochloride is again dissolved in water, the solution is rendered alkaline with potassium carbonate and the base extracted with ether. The ethereal solution is dried and the hydrochloride of the tetra-arseno compound is obtained with ethereal hydrochloric acid.

In order to form the arsonic acid the hydrochloride of the tetra-arseno compound is dissolved in water and oxidized at room temperature with 3% hydrogen peroxide. The thus obtained arsonic acid is isolated in the form of the sodium salt according to the method described in Example 1.

An identical product is obtained by the basic alkylation of the 4—4'-diarsonic acid of diphenyl-disulfide. 60 grams of the sulfate of 4—4'-diamino-diphenyl-disulfide are dissolved in hot 10% sulfuric acid, pored on ice and then diazotized with 24 grams of sodium nitrite. A solution of 5 grams of copper sulfate in 50 cc. of water and a solution of 60 grams of dibasic sodium arsenite in 330 cc. of 5% caustic soda solution is added, followed subsequently by the addition of 100 cc. of concentrated caustic soda solution. After standing over night the greater part of the alkali is neutralized with hydrochloric acid and concentration to about 500 cc. is effected with repeated removal of the common salt. The arsonic acid is precipitated in the cold with hyrochloric acid, it is then boiled with a solution of 16 grams of sodium in 500 cc. of dried alcohol and 45 grams of diethyl-amino-ethyl-chloride are added. After evaporating off the alcohol in vacuo the residue is taken up in water, acidified and the hydrochloride is dried. The purification is carried out as described above.

We claim:

1. The new N-diethylaminoethyl-para-aminophenyl arsonic acid having the formula:

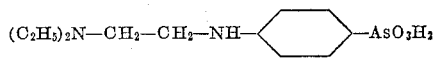

forming a sodium salt, being a hygroscopic snow-white powder, being readily soluble in water from which the free arsonic acid is not precipitated by the addition of an acid and containing 22.1 percent of arsenic.

2. The N-diethylaminoethyl-methylaminophenyl-4-arsonic acid of the formula:

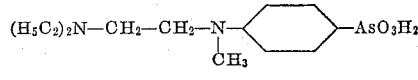

forming with caustic soda solution the corresponding sodium salt.

3. The compounds of the formula

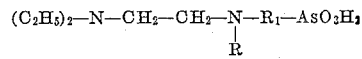

wherein R stands for hydrogen or methyl and $R_1$ stands for phenylene, which products are generally whitish to yellow powders which are soluble in acids to neutral solution and are suitable for therapeutic purposes.

WERNER SCHULEMANN.
FRITZ MIETZSCH.